3,192,205
METHINE DYES CONTAINING AN AUXO-
CHROMOPHORIC SYSTEM
Henri Depoorter and Jean Marie Nys, Mortsel-Antwerp, and André Emile van Dormael, Heverlee-Leuven, Belgium, assignors to Gevaert Photo-Producten N.V., Mortsel, Belgium, a Belgian company
No Drawing. Filed Jan. 10, 1962, Ser. No. 166,454
Claims priority, application Great Britain, Jan. 16, 1961, 1,795/61
6 Claims. (Cl. 260—240)

The present invention relates to new methine dyes and the preparation thereof.

In our Belgian patent specification No. 583,922 methine dyes are described characterized by the following auxochromophoric system:

wherein $X_a$ and $X_d$ each represents an atom or group of atoms which can readily raise or lower its covalency by one, whereby $X_a$ acts as an electron-acceptor such as a double bound oxygen atom [=O], a quaternary nitrogen atom

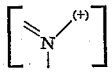

or the group

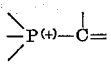

and whereby $X_d$ acts as an electron-donor such as a negatively charged oxygen atom, [—O$^{(-)}$], a tertiary nitrogen atom

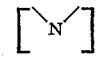

or the group

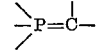

and y represents 0 a positive integer.

A number of methine dyes has now been found, containing the above-mentioned auxochromophoric system, which is more specially represented by the following general Formula 1

(I) 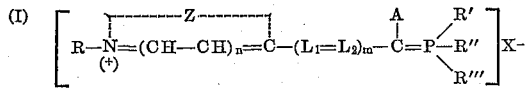

wherein:

A represents an ester group e.g. a carbethoxy group or a

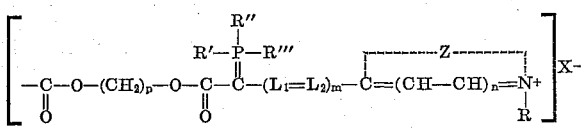

group an acyl group e.g. a benzoyl group, or a nitrile group,

R represents an alkyl radical, a substituted alkyl radical, e.g. a halogen substituted alkyl, a cyano substituted alkyl, a hydroxyalkyl radical, an alkoxyalkyl radical, an acyloxy alkyl radical, a carbalkoxyalkyl radical, an acylalkyl radical, a hydroxyalkoxy alkyl radical, an alkoxy alkoxyalkyl radical, a cyclo alkyl radical, a substituted cyclo alkyl radical, an aryl radical, a substituted aryl radical, an aralkyl radical, a substituted aralkyl radical or a group with an acid character which forms by splitting off the radical X$^-$ under the form of the acid HX, a betaine-like structure with the hetero-nitrogen atom whereupon R is bound, such as a carboxyalkyl radical e.g. a carboxyethyl radical, a carboxyaryl radical e.g. a carboxyphenyl radical, a carboxyaralkyl radical e.g. a carboxybenzyl radical, a —L—O—SO$_3$H group, a —L—SO$_2$OH group, a

group, a

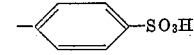

group, a

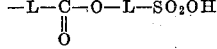

group, a

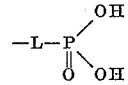

group, a

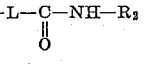

group, a

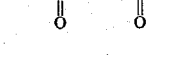

group, a

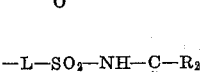

group, a

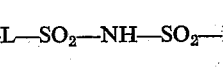

group, a

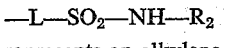

group, a —L—SO$_2$—NH—SO$_2$—R$_2$ group, a —L—NH—SO$_2$—R$_2$ group or a —L—SO$_2$—NH—R$_2$ group, wherein L represents an alkylene radical such as a —(CH$_2$)$_q$— radical wherein q represents a positive integer from 1 to 4, or a substituted alkylene radical, R$_1$ represents a hydrogen atom, an alkyl radical, a substituted alkyl radical, a cyclo alkyl radical, a substituted cycloalkyl radical, an aryl radical, a substituted aryl radical, an aralkyl radical, or a substituted aralkyl radical, and R$_2$ represents a hydrogen atom, an alkyl radical, a substituted alkyl radical, a cycloalkyl radical, a substituted cycloalkyl radical, an aryl radical, a substituted aryl radical, an aralkyl radical, a substituted aralkyl radical, an amino group or a substituted amino group.

L$_1$ and L$_2$ each represent the same or different a methine group or a substituted methine group e.g. an alkyl substituted methine group, an aralkyl substituted methine group, an aryl substituted methine group, an alkoxy substituted methine group or an alkyl mercapto substituted methine group, Z represents the non-metallic atoms to complete a heterocyclic nucleus containing 5 to 6 atoms in the heterocyclic ring such as those of the thiazole series (e.g. thiazole, 4-methylthiazole, 4-phenylthiazole, 5-methylthiazole, 5-phenylthiazole, 4,5-dimethylthiazole, 4,5-diphenylthiazole, 4-(2-thienyl)-thiazole, those of the benzothiazole series (e.g. benzothiazole, 4-chlorobenzothiazole,
5-chlorobenzothiazole,
6-chlorobenzothiazole,
7-chlorobenzothiazole,
4-methylbenzothiazole,
5-methylbenzothiazole,
6-methylbenzothiazole,
5-bromobenzothiazole,
6-bromobenzothiazole,
4-phenylbenzothiazole,
5-phenylbenzothiazole,
4-methoxybenzothiazole,
5-methoxybenzothiazole,
6-methoxybenzothiazole,
5-iodobenzothiazole,
6-iodobenzothiazole,
4-ethoxybenzothiazole,
5-ethoxybenzothiazole,
4,5,6,7-tetrahydrobenzothiazole,
5,6-dimethoxybenzothiazole,
5,6-dioxymethylenebenzothiazole,
5-hydroxybenzothiazole,
6-hydroxybenzothiazole,
5,6-dimethylbenzothiazole, those of the naphthothiazole series (e.g. naphtho [2,1-d] thiazole, naphtho [1,2-d] thiazole, 5-methoxynaphtho [1,2-d] thiazole,
5-ethoxynaphtho [1,2-d] thiazole,
8-methoxynaphtho [2,1-d] thiazole,
7-methoxynaphtho [2,1-d] thiazole), those of the thionaphtheno [7,6,d] thiazole series (e.g. 4-methoxythionaphtheno [7,6,d] thiazole), those of the oxazole series (e.g. 4-methyloxazole, 5-methyloxazole,
4-phenyloxazole,
4,5-diphenyloxazole,
4-ethyloxazole,
4,5-dimethyloxazole,
5-phenyloxazole), those of the benzoxazole series (e.g. benzoxazole, 5-chlorobenzoxazole,
5-methylbenzoxazole,
5-phenylbenzoxazole,
6-methylbenzoxazole,
5,6-dimethylbenzoxazole,
4,6-dimethylbenzoxazole,
5-methoxybenzoxazole,
6-methoxybenzoxazole,
5-hydroxybenzoxazole,
6-hydroxy-benzoxazole), those of the naphthoxazole series (e.g. naphtho [2,1-d] oxazole, naphtho [1,2-d] oxazole), those of the selenazole series (e.g. 4-methylselenazole, 4-phenylselenazole), those of the benzoselenazole series (e.g. benzoselenazole, 5-chlorobenzoselenazole,
5-methoxybenzoselenazole,
5-hydroxybenzoselenazole,
4,5,6,7,-tetrahydrobenzoselenazole), those of the naphthoselenazole series (e.g. naphtho [2,1-d] selenazole, naphtho [1,2-d] selenazole), those of the thiazoline series (e.g. thiazoline,
4-methylthiazoline,
4-hydroxymethyl-4-methylthiazoline,
4,4-bis-hydroxymethylthiazoline,
4-acetoxymethyl-4-methylthiazoline,
4,4-bis-acetoxmethylthiazoline),
those of the thiazolidine series (e.g.
2-benzothiazolylidene-4-thiazolidone),
those of the oxazoline series (e.g. oxazoline, 4-hydroxymethyl-4-methyloxazoline,
4,4-bis-hydroxymethyloxazoline,
4-acetoxymethyl-4-methyloxazoline,
4,4-bis-acetoxymethyloxazoline), those of the oxazolidine series, those of the selenazoline series (e.g. selenazoline), those of the 2-quinoline series (e.g. the quinoline, 3-methylquinoline,
5-methylquinoline,
7-methylquinoline,
8-methylquinoline,
6-chloroquinoline,
8-chloroquinoline,
6-methoxyquinoline,
6-ethoxyquinoline,
6-hydroxyquinoline,
8-hydroxyquinoline etc.), those of the 4-quinoline series (e.g. quinoline,
6-methoxyquinoline,
7-methylquinoline,
8-methylquinoline), those of the 1-isoquinoline series (e.g. isoquinoline, 3,4-dihydroisoquinoline), those of the 3-isoquinoline series (e.g. isoquinoline), those of the 3,3-dialkylindolenine series (e.g.

3,3-dimethylindolenine,
3,3,5-trimethylinodlenine,
3,3,7-trimethylindolenine), those of the pyridine series (e.g. pyridine,
5-methylpyridine),
those of the benzimidazole series (e.g.
1-ethylbenzimidazole,
1-phenylbenzimidazole,
1-ethyl-5,6-dichlorobenzimidazole,
1-hydroxyethyl-5,6-dichlorobenzimidazole,
1-ethyl-5-chlorobenzimidazole,
1-ethyl-5,6-dibromobenzimidazole,
1-ethyl-5-chloro-6-aminobenzimidazole,
1-ethyl-5-chloro-6-bromobenzimidazole,
1-ethyl-5-phenylbenzimidazole,
1-ethyl-5-fluorobenzimidazole,
1-ethyl-5-cyanobenzimidazole,
1-($\beta$-acetoxyethyl)-5-cyanobenzimidazole,
1-ethyl-5-chloro-6-cyano benzimidazole,
1-ethyl-5-fluoro-6-cyano benzimidazole,
1-ethyl-5-acetyl-benzimidazole,
1-ethyl-5-chloro-6-fluorobenzimidazole,
1-ethyl-5-carboxybenzimidazole,
1-ethyl-7-carboxybenzimidazole,
1-ethyl-5-carbethoxybenzimidazole,
1-ethyl-7-carbethoxybenzimidazole,
1-ethyl-5-sulphonamidobenzimidazole,
1-ethyl-5-N-ethylsulphonamidobenzimidazole, R', R" and R'" each represent the same or different an alkyl radical, a substituted alkyl radical, a cycloalkyl radical, a substituted cycloalkyl radical, an aryl radical, a substituted aryl radical, an aralkyl radical or a substituted aralkyl radical, $n$ represents 0 or 1,
$m$ represents 0 or 1,
$p$ represents a positive integer from 1 to 4, and
X represents an acid radical of the type used in methine dyes e.g. chloride, bromide, iodide, perchlorate, benzene sulphonate, p-tolusulphonate, methyl sulphate, ethyl sulphate, or propylsulphate.

The dyes of this type are optical sensitizers for silver halide emulsions and also for electrophotographic materials whereby photoconductive compounds such as zinc oxide are used in the photoconductive layer.

As shown hereinafter in the examples the new methine dyes are particularly useful for extending the spectral sensitivity of the normally used gelatino-silver chloride, gelatino-silver cholorbromide, gelatino-silver bromide, gelatino silver bromo-iodide, and gelatino silver chlorobromo iodide emulsions. Other types of emulsions, coating techniques, the composition and the use of the photographic materials utilizing sensitizing dyes containing the above mentioned auxochromophoric system are given in more details in the Belgian patent specification No. 583,922.

The methine dyes of the present invention can be prepared by condensing a phosphonium salt according to Formula II or its corresponding phosphorane compound represented by Formula III:

$$\left[ \begin{array}{c} H^{(+)} \quad R' \\ A-C=P-R'' \\ H \quad R''' \end{array} \right] X^- \qquad \begin{array}{c} R' \\ A-C=P-R'' \\ H \quad R''' \end{array}$$

(II)    (III)

wherein A, R', R'', R''' and X have the same significance as in the general Formula I with an electrophilic methine dye intermediate capable of reacting with a compound containing a reactive methylene or substituted methylene group.

The condensation with the compound according to Formula II must be carried out in alkaline medium in order to form "in situ" the phosphorane compound. In some cases a strong non-aqueous organic base such as triethylamine must be used since the phosphorane compound formed "in situ" is not stable enough in an aqueous alkaline medium such as an aqueous medium of sodium hydroxide.

As methine dye intermediate compounds capable of reacting with a methylene phosphonium salt or a methylene phosphorane compound corresponding respectively to Formulae II and III can be mentioned:

$$\left[ R-\underset{+}{N}=(CH-CH)_n=\overset{\overset{\mid------Z------\mid}{}}{C}-L_1=L_2-Q \right] X^-$$

wherein:
Q represents an anilido group e.g. a

—NH—⟨phenyl⟩ group, a

—N—⟨phenyl⟩
|
C=O
|
CH$_3$ group or a

—N—⟨phenyl⟩
|
SO$_2$
|
⟨phenyl⟩
|
CH$_3$ group, a halogen atom such as a chlorine atom, an alkoxy group e.g. a CH$_3$—O— group, an aryloxygroup e.g. a ⟨phenyl⟩—O— group, an alkylmercapto group e.g. a CH$_3$—S— group or an arylmercapto group e.g. a ⟨phenyl⟩—S— group, and
R, L$_1$, L$_2$, X, n and Z have the same significance as described in the general Formula I.

(b)   $\left[ R-\underset{+}{N}=(CH-CH)_n=\overset{\overset{\mid------Z------\mid}{}}{C}-Y \right] X^-$ wherein:
Y represents an alkylmercapto group e.g. a CH$_3$—S— group, an arylmercapto group e.g. a ⟨phenyl⟩—S— group or a halogen atom such as a chlorine atom, and
R, X, n and Z have the same significance as described in the general Formula I.

(c)   $G=(L_1-L_2)_m=\overset{\overset{\mid--Z--\mid}{}}{C}----\underset{\underset{R}{\mid}}{N}$ wherein
G represents a reactive functional group e.g. an oxygen atom, a sulphur atom, a selenium atom or an imino group such as a phenyl imino group, and
R, L$_1$, L$_2$ Z and m have the same significance as described in general Formula I.

The condensation reactions with the methine dye intermediates mentioned under a, b and c are chemically generic or equivalent since the condensation in all cases proceeds with a quaternary salt.

In the case a compound mentioned under a and b is used, it is very clear that the reaction proceeds with a quaternary salt. In the case, however, the reaction proceeds with the methine dye intermediate mentioned under c, the quaternary salt has to be formed "in situ" during the reacion, by carrying out the condensation in the presence of an acidic compound e.g. acetic acid or a compound which forms an acid medium during the reaction e.g. an acid anhydride such as acetic anhydride.

The condensation reaction with the methine dye intermediates mentioned under a and b is advantageously carried out in the presence of a basic condensing agent, e.g. a trialkyl amine such as triethylamine, pyridine, N-alkyl-piperidine or the like. The condensation can also be carried out in the presence of an inert diluent such as methanol, ethanol acetone, 1-4,dioxane or acetic anhydride occasionally but not necessarily in the presence of a basic condensing agent as set forth.

Methine dye intermediates wherein R represents a hydroxyalkyl radical are described in the British patent specification 513,170.

Methine dye intermediates wherein R represents an alkoxyalkyl radical, an acyloxy alkyl radical, a carbalkoxy alkyl radical, an acylalkyl radical, a hydroxy alkoxyalkyl radical or an alkoxyalkoxyalkyl radical are described in the French patent specification 847,660.

Some methine dye intermediates wherein R represents a radical which forms a betaine-like structure with the heterocyclic nitrogen atom whereupon R is bound on are described in the patent literature given hereinafter.

Methine dye intermediates wherein R represents a carboxyalkyl radical are described in the French patent specification 847,660 and the German patent specification 892,965.

Methine dye intermediates wherein R represents a substituted aralkyl radical such as a carboxybenzyl radical are described in the British patent specification 615,431.

Methine dye intermediates wherein R represents a —L—SO$_3$H group or a

—CH$_2$—⟨phenyl⟩—SO$_3$H group as mentioned in the general Formula I are described in the British patent specifications 654,683 and 654,690.

Methine dye intermediates wherein R represents a

—L—O—S(=O)(=O)OH group as mentioned in the general Formula I are described in the French patent specification 1,149,769 and the United States patent specification 2,557,880.

Methine dye intermediates wherein R represents a

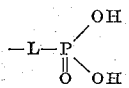

group as mentioned in the general Formula I are described in the Belgian patent specification 568,840.

Methine dye intermediates wherein R represents a $$-L-SO_2-NH-\underset{\underset{O}{\|}}{C}-R_2$$

group, a $$-L-\underset{\underset{O}{\|}}{C}-NH-SO_2-R_2$$

group, a —L—NH—SO$_2$—R$_2$ group, a $$-L-SO_2-NH-SO_2-R_2$$

group or a $$-L-SO_2-NH-R_2$$

group as mentioned in the general Formula I are described in the Belgian patent specification 569,130.

Methine dye intermediates wherein R represents a $$-L-\underset{\underset{O}{\|}}{C}-O-L-SO_2OH$$

group as mentioned in the general Formula I are described in the French patent specification 1,239,318.

Some methylene phosphorane compounds corresponding to Formula III can be prepared starting from their corresponding phosphonium salts according to methods described in the literature given hereinafter.

Carbethoxy methylene triphenyl phosphorane represented by the formula:

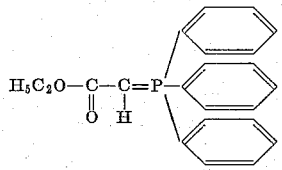

is prepared according to O. Isler, H. Guttman, M. Montavon, R. Rugg, G. Ryser and P. Zeller, Helv. Chimica Acta 40, 1247 (1957).

Cyano methylene triphenyl phosporane and benzoyl methylene triphenyl phosphorane resp. represented by the formulae:

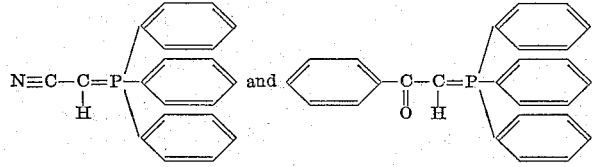

are prepared according to S. Trippett and D. M. Walker, J. Chem. Soc., 3874 (1959).

The phosphorane intermediate compounds such as 3,6-dioxa-2,7-dioxo-1,8 octanediylidene bis(triphenyl phosphorane) represented by the formula:

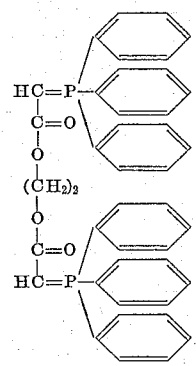

can be prepared according to J. A. Ford and Ch. V. Wilson, J. Org. Chem. 26, 1433 (1961).

The following examples give a more detailed description of some methods for preparing the new methine dyes. These examples are not to be considered as limiting the scope of our invention but merely as a survey of the most usual condensation methods. After each description of the preparation, an example is given of the optical sensitizing influence of the dye on a usual light sensitive silver halide emulsion.

*Example 1*

The methine dye of the formula:

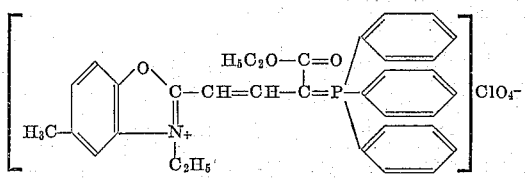

is prepared as follows:

1.75 g. (0.005 mole) of carbethoxy methylene triphenyl phosphorane, 1.4 g. (0.005 mole) of 2-(β-phenylimino-ethylidene)-3-ethyl-5-methyl-2,3-dihydrobenzoxazole and 15 cm.³ of acetic anhydride are stirred for 2 hrs. at room temperature. The formed dye is precipitated with ether, converted in its perchlorate salt and recrystallized 3 times from ethanol. Melting point: 220° C. with decomposition. Absorption maximum: 412 mμ.

A silver chloride emulsion containing per kg. 30 mg. of this dyestuff shows a maximum sensitivity at 430 mμ.

*Example 2*

The methine dye of the formula:

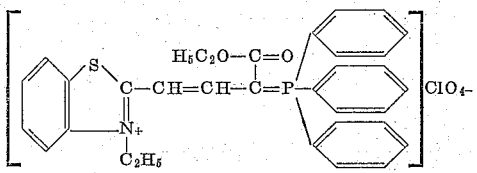

is prepared as in Example 1 starting from: 1.75 g. (0.005 mole) of carbethoxymethylene triphenylphosphorane, 1.4 g. (0.005 mole) of 2-(β-phenylimino ethyidene)-3-ethyl-2,3-dihydrobenzothiazole and 15 cm.³ of acetic anhydride. Melting point: 150° C. with decomposition. Absorption maximum: 446 mμ.

A silver chloride emulsion containing per kg. 30 mg. of this dyestuff shows a maximum sensitivity at 465 mμ.

*Example 3*

The methine dye of the formula:

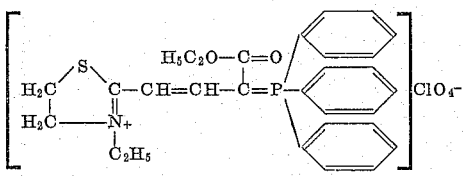

is prepared as in Example 1 starting from 1.75 (0.005 mole) of carbethoxymethylene triphenyl phosphorane, 1.55 g. (0.005 mole) of 2-(β-anilinovinyl)-3-ethylthiazolinium bromide, 15 cm.³ of acetic anhydride and 1.4 cm.³ (0.01 mole) of triethylamine. Melting point: 190° C. with decomposition. Absorption maximum: 388 mμ.

A silver chloride emulsion containing per kg. 65 mg. of this dyestuff shows a maximum sensitivity at 410 mμ.

*Example 4*

The methine dye of the formula:

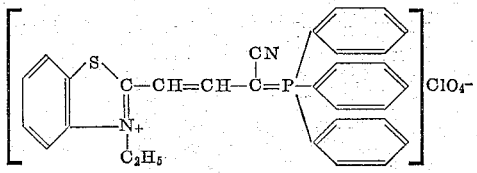

is prepared analogously to Example 1 starting from 1.5 g. (0.005 mole) of cyanomethylene triphenyl phosphorane, 1.4 g. (0.005 mole) of 2-(β-phenylimino-ethylidene)-3-ethyl-2,3-dihydrobenzthiazole, 15 cm.³ of acetic anhydride. Melting point: 240° C. with decomposition. Absorption maximum: 446 mμ.

A silver chloride emulsion containing per kg. 30 mg. of this dyestuff shows a maximum sensitivity at 470–480 mμ.

Example 5

The methine dye of the formula:

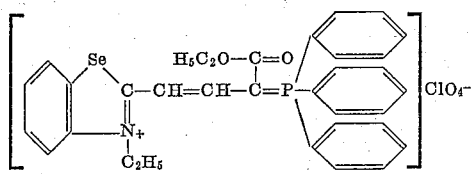

is prepared analogously to Example 1 starting from 1.75 g. (0.005 mol) of carbethoxy methylene triphenyl phosphorane 1.65 g. (0.005 mol) of 2-(β-phenylimino-ethylidene)-3-ethyl-2,3-dihydrobenzoselenazole and 20 cm.³ of acetic anhydride.

Melting point: 130° with decomposition. Absorption maximum: 452 mμ.

A silver chloride emulsion containing per kg. 30 mg. of this dyestuff shows a maximum sensitivity at 480 mμ.

Example 6

The methine dye of the formula:

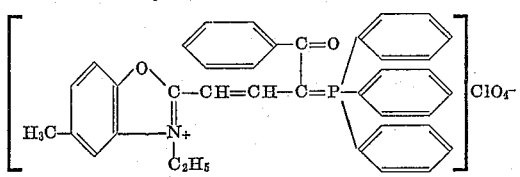

is prepared analogously to Example 1 starting from 1.95 g. (0.005 mol) of benzoyl methylene triphenyl phosphorane instead of 1.75 g. of carbethoxy methylene triphenyl phosphorane.

Absorption maximum: 413 mμ.

A silver chloride emulsion containing per kg. 30 mg. of this dyestuff shows a maximum sensitivity at 430 mμ.

Example 7

The methine dye of the formula:

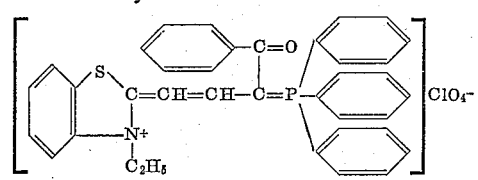

is prepared analogously to Example 2 starting from 1.95 g. (0.005 mol) of benzoyl methylene triphenyl phosphorane instead of 1.75 g. of carbethoxy methylene triphenyl phosporane.

Absorption maximum: 445 mμ.

A silver chloride emulsion containing per kg. 30 mg. of this dyestuff shows a maximum sensitivity at 465–470 mμ.

Example 8

The methine dye of the formula:

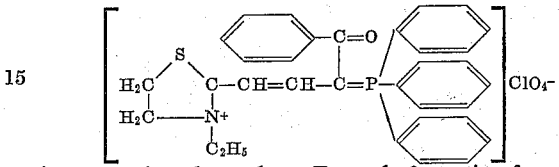

is prepared analogously to Example 3 starting from 1.95 g. (0.005 mol) of benzoyl methylene triphenyl phosphorane instead of 1.75 g. of carbethoxy methylene triphenyl phosphorane.

A silver chloride emulsion containing per kg. 65 mg. of this dyestuff shows a maximum sensitivity at 410 mμ.

Example 9

The methine dye of the formula:

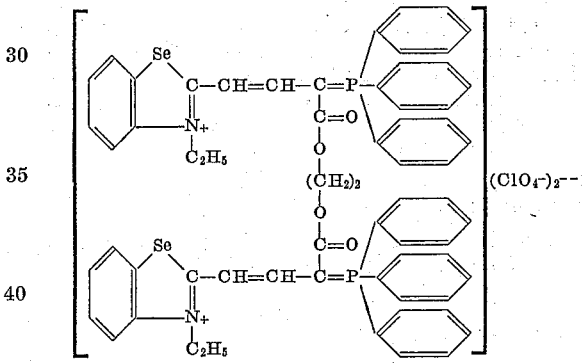

is prepared as follows:

3.4 g. (0.005 mol) of 3,6-dioxa-2,7-dioxo-1,8-octanediylidene bis(triphenylphosphorane), 3.27 g. (0.01 mol) of 2-(β-phenylimino ethylidene)-3-ethyl-2,3-dihydrobenzoselenazole, 20 cm.³ of acetic anhydride and 2.8 cm.³ (0.02 mol) of triethylamine are heated for 3 hours on a water bath at 60–65°. After cooling, the dye is precipitated with ether, dissolved in ethanol, converted into its perchlorate by pouring into a 10% solution of sodiumperchlorate and recrystallized from ethanol.

Yield: 2.5 g. (37%). Melting point: 150° C. with decomposition. Absorption maximum: 450 mμ.

A silver chloride emulsion containing per kg. 200 mg. of this dyestuff shows a maximum sensitivity at 490 mμ.

Example 10

The methine dye of the formula:

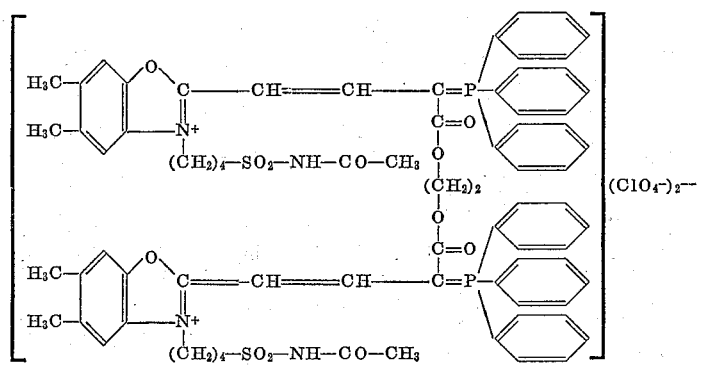

is prepared in the same way as Example 9 starting from 5.2 g. (0.01 mol) of 2-(β-anilinovinyl)-3-(N-acetyl-ω-sulfamylbutyl)-5,6-dimethyl benzoxazolium bromide instead of 3.27 g. of 2-(β-phenyliminoethylidene)-3-ethyl-2,3-dihydrobenzoselenazole.

Yield: 0.8 g. Melting point: 195° C. with decomposition. Absorption maximum: 415 mμ.

A silver chloride emulsion containing per kg. 200 mg. of this dyestuff shows a maximum sensitivity at 450 mμ.

*Example 11*

The methine dye of the formula:

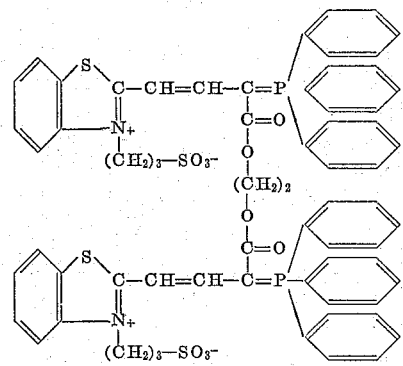

is prepared analogously as Example 9 starting from 3.74 g. (0.01 mol) of 2-(β-anilinovinyl)-3(ω-sulfopropyl) benzothiazolium betaine instead of 3.27 g. of 2-(β-phenyliminoethylidene)-3 - ethyl - 2,3 - dihydrobenzo selenazole. The dye crystallises on cooling and is purified by three recrystallisations from ethanol ether.

Yield: 1.35 g. Melting point: 278° C. Absorption maximum: 446 mμ.

A silver chloride emulsion containing per kg. 200 mg. of this dyestuff has a maximum sensitivity at 470 mμ.

*Example 12*

The dye of the formula:

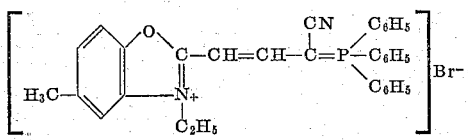

is prepared as follows:
3.28 g. (0.01 mol) of cyanomethyltriphenylphosphonium bromide, 2.78 g. (0.01 mol) of 2-(β-phenyliminoethylidene)-3-ethyl-5-methyl-2,3-dihydrobenzoxazole and 25 cm.³ of acetic anhydride are stirred for 2 hours at room temperature. The dye is precipitated with ether and recrystallised from ethanol ether.

Yield: 2.9 g. (51%). Melting point: 261° C. Absorption maximum: 410 mμ.

A silver chloride emulsion containing per kg. 200 mg. of this dye has a maximum sensitivity at 450 mμ.

*Example 13*

The dye of the formula:

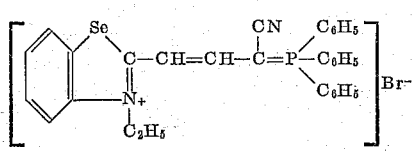

is prepared analogously as Example 12 starting from 3.3 g. (0.01 mol) of 2-(β-phenyliminoethylidene)-3-ethyl-2,3-dihydrobenzoselenazole instead of 2.78 g. of 2-(β-phenyliminoethylidene) - 3 - ethyl-5-methyl-2,3-dihydrobenzoxazole.

Yield: 3.2 g. (52%). Melting point 272° C. Absorption maximum: 450 mμ.

A silver chloride emulsion containing per kg. 200 mg. of this dyestuff has a maximum sensitivity at 490 mμ.

*Example 14*

The dye of the formula:

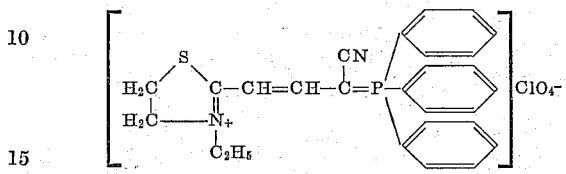

is prepared as follows:
3.82 g. (0.01 mol) of cyanomethyltriphenylphosphonium bromide, 3.13 g. (0.01 mol) of 2-(β-anilinovinyl)-3-ethylthiazolinium bromide, 25 cm.³ of acetic anhydride and 2.8 cm.³ (0.02 mol) of triethyl amine are heated on a water bath for 3 hours at 60–70° C. Then, the reaction mixture is cooled and diluted with ether. The precipitated dye is dissolved in ethanol and converted into its perchlorate with a 10% solution of sodium perchlorate. Purification is performed by recrystallizing twice from ethanol.

Yield: 1 g. (18%). Melting point: 180° C. Absorption maximum 390 mμ.

A silver chloride emulsion containing per kg. 200 mg. of this dyestuff has a maximum sensitivity at 430 mμ.

*Example 15*

The dye of the formula:

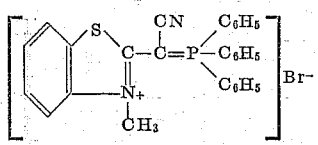

is prepared as follows:
3.82 g. (0.01 mol) of cyanomethyltriphenylphosphonium bromide, 3.07 g. (0.01 mol) of 2-methylmercapto-3-methylbenzothiazolium methylsulfate, 25 cm.³ of ethanol and 2.8 cm.³ (0.02 mol) of triethylamine are refluxed for 10 minutes. The dye is precipitated with ether and recrystallized from ethanol ether.

Yield: 1 g. (20%). Melting point: 270° C. Absorption maximum: 344 mμ.

*Example 16*

The dye of the formula:

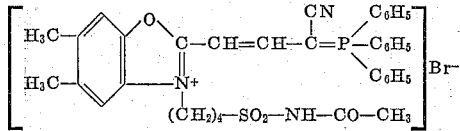

is prepared as follows:
1.9 g. (0.005 mol) of cyanomethyltriphenylphosphonium bromide, 2.6 g. (0.005 mol) of 2-(β-anilinovinyl)-3-(N-acetyl-ω-sulfamylbutyl)-5,6 - dimethylbenzoxazolium bromide, 25 cm.³ acetic anhydride and 1.4 cm.³ (0.01 mol) of triethylamine, are allowed to react for 3 hours at 55° C. The dye is precipitated with ether and recrystallized from ethanol ether.

Yield: 0.8 g. (22%). Melting point: 232° C. Absorption maximum: 410 mμ.

A silver chloride emulsion containing per kg. 200 mg. of this dyestuff has a maximum sensitivity at 455 mμ.

Example 17

The dye of the formula:

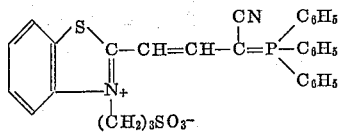

is prepared as follows:

3.82 g. (0.01 mol) of cyanomethyltriphenylphosphonium bromide, 3.8 g. (0.01 mol) of 2-($\beta$-anilinovinyl)-3-($\omega$-sulfopropyl) benzothiazolium betaine, 30 cm.$^2$ of acetic anhydride and 2.8 cm.$^3$ (0.02 mol) of triethylamine are allowed to react as described in Example 16.

Yield: 2 g. (34%). Melting point: 293° C. Absorption maximum: 448 m$\mu$.

A silver chloride emulsion containing per kg. 200 mg. of this dyestuff has a maximum sensitivity at 485 m$\mu$.

Example 18

The methine dye of the formula:

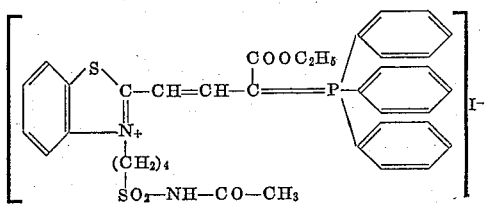

is prepared as follows:

1.75 g. (0.005 mol) of carbethoxymethyltriphenylphosphorane, 2.55 g. (0.005 mol) of 2-($\beta$-anilinovinyl)-3-(N-acetyl-$\omega$-sulfamylbutyl)benzothiazolium bromide are dissolved in 25 cm.$^3$ of acetic anhydride and allowed to stand for 24 hours at room temperature. The dye is precipitated with ether, dissolved in ethanol, converted into iodide by pouring into a 10% solution of potassium iodide and recrystallized from ethanol ether.

Yield: 0.5 g. (12%). Melting point: 198° C. Absorption maximum 445 m$\mu$.

A silver chloride emulsion containing per kg. 30 mg. of this dyestuff has a maximum sensitivity at 470 m$\mu$.

We claim:
1. A methine dye having a formula which is a member of the group consisting of

(I)

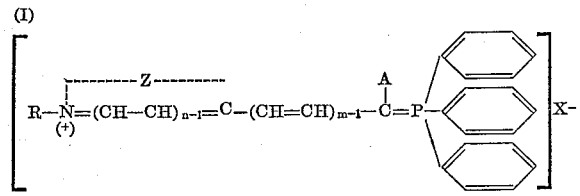

wherein:
A is a member selected from the group consisting of carbethoxy, nitrile and benzoyl,
R is a member selected from the group consisting of lower alkyl, 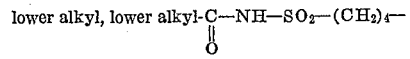

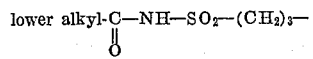

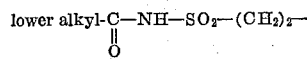

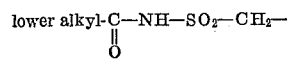

$HO_3S—(CH_2)_4—$, $HO_3S—(CH_2)_3—$, $HO_3S—(CH_2)_2—$, and $HO_3S—CH_2—$,

Z is the non-metallic atoms necessary to complete a heterocyclic nucleus selected from the group consisting of the thiazole series, benzothiazole series, naphthothiazole series, thionaphtheno[7', 6' d]thiazole series, oxazole series, benzoxazole series, naphthoxazole series, selenazole series, benzoselenazole series, naphthoselenazole series, thiazoline series, thiazolidine series, oxazoline series, oxazolidine series, selenazoline series, 2-quinoline series, 4-quinoline series, 1-isoquinoline series, 3-isoquinoline series, pyridine series, and benzimidazole series, $n$ is a positive integer selected from the group consisting of 1 and 2, $m$ is a positive integer selected from the group consisting of 1 and 2, and X is an acid radical of the type used in methine dye salts, (II)

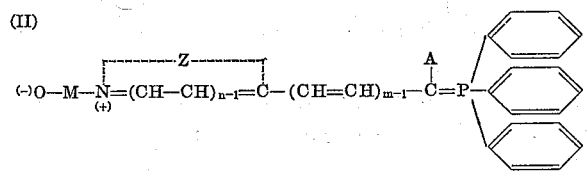

wherein:
M is a member selected from the group consisting of

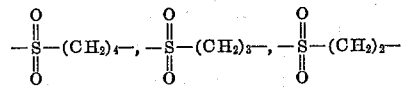

and

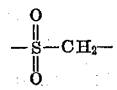

and
A, Z, $n$ and $m$ have the same significance as described for Formula 1, (III)

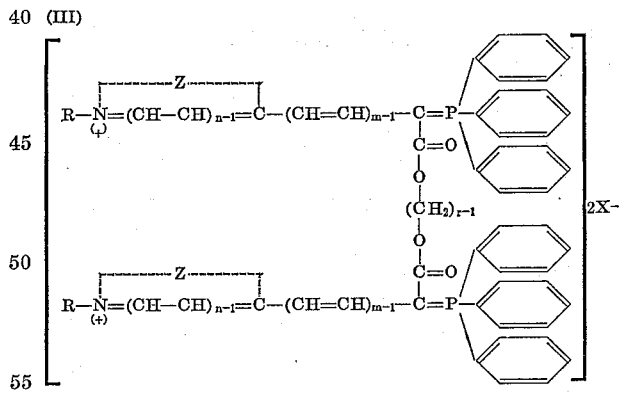

wherein:
$r$ is a positive integer which is a member of the group consisting of 2, 3, 4 and 5, and
R, Z, X, $n$ and $m$ have the same significance as described for Formula I, (IV)

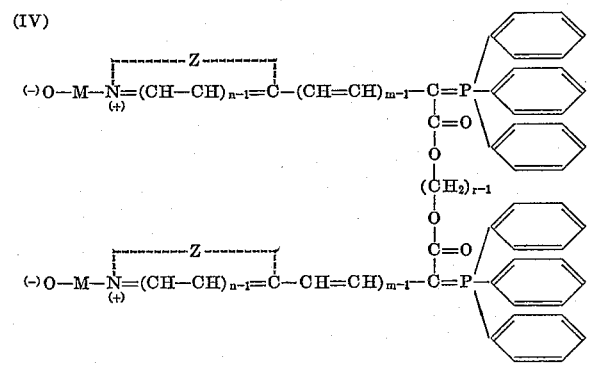

wherein
  r is a positive integer which is a member of the group consisting of 2, 3, 4 and 5, and
  M, Z, n and m have the same significance as described for Formula II.

2. A methine dye having the formula:

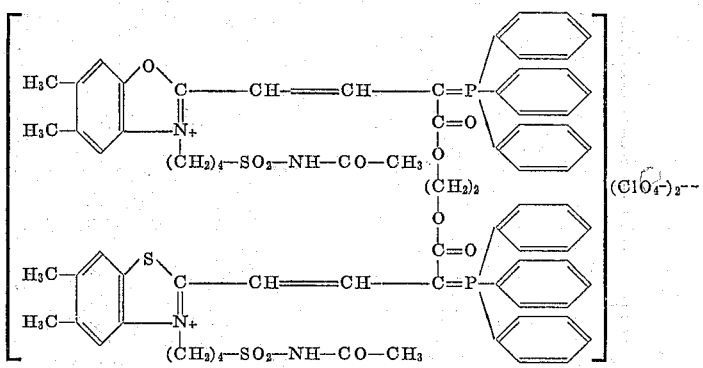

3. A methine dye having the formula:

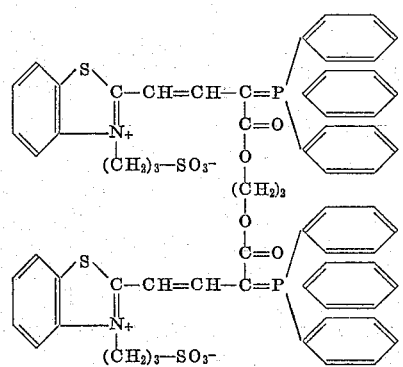

4. A methine dye having the formula:

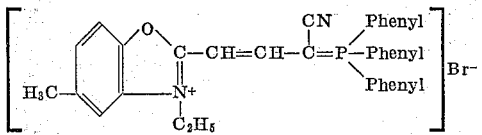

5. A methine dye having the formula:

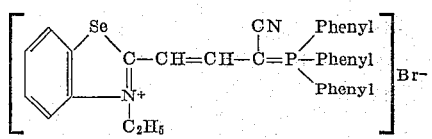

6. A methine dye having the formula:

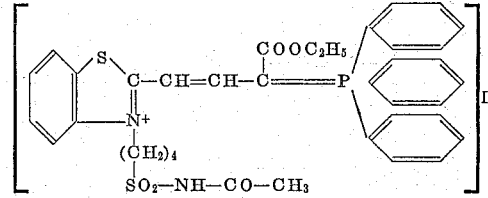

References Cited by the Examiner

UNITED STATES PATENTS

| | | | |
|---|---|---|---|
| 2,905,666 | 9/59 | De Stevens | 260—240 |
| 2,912,433 | 11/59 | Sprague | 260—240 |
| 2,912,434 | 11/59 | De Stevens et al. | 260—240 |
| 2,916,487 | 12/59 | De Stevens | 260—240 |
| 2,916,488 | 12/59 | De Stevens | 260—240 |
| 3,033,681 | 5/62 | Knott | 260—240 |

OTHER REFERENCES

Kukhtin et al.: Doklady Adad. Nauk, U.S.S.R., volume 140, pages 601–4 (September 1961).

IRVING MARCUS, *Primary Examiner.*

WALTER A. MODANCE, *Examiner.*